Jan. 1, 1935.　　　　E. E. HEARING　　　　1,986,633
SINGLE STAYING MACHINE CUTTER
Filed Oct. 17, 1932
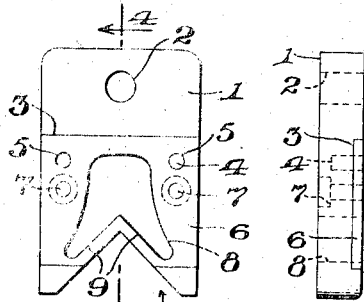
Fig. 2.   Fig. 1.
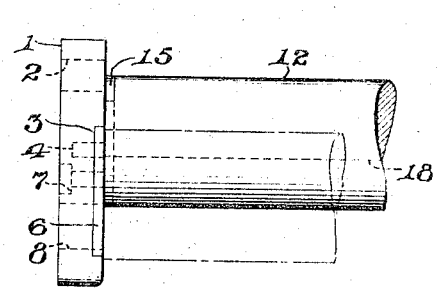
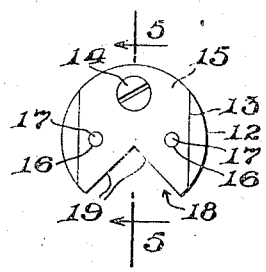
Fig. 3.
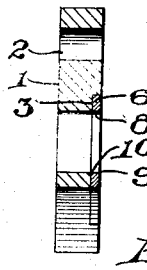
Fig. 4.
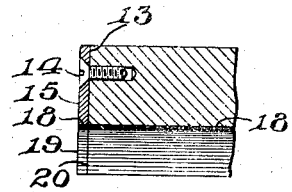
Fig. 5.
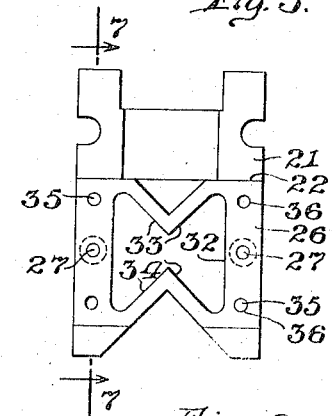
Fig. 6.
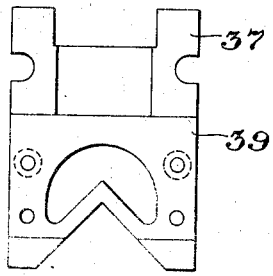
Fig. 8.
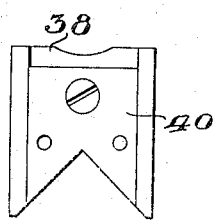
Fig. 9.
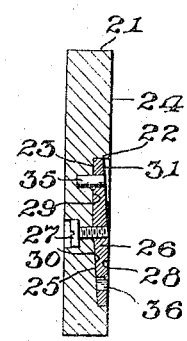
Fig. 7.
INVENTOR,
Elmer E. Hearing,
BY
J. Stuart Freeman
ATTORNEY.

Patented Jan. 1, 1935

1,986,633

UNITED STATES PATENT OFFICE 1,986,633

SINGLE STAYING MACHINE CUTTER

Elmer E. Hearing, Philadelphia, Pa., assignor to Kennedy-Hearing Company, Philadelphia, Pa.

Application October 17, 1932, Serial No. 638,164

2 Claims. (Cl. 164—58)

The object of the invention is to provide improvements in interchangeable and reversible cutters broadly, but more particularly with relation to the cutters used in single staying machines.

These cutters are two in number for each machine, that is, the forward or reciprocating cutter and the rear or stationary cutter, and in each case they have heretofore comprised relatively heavy members, the adjacent surfaces of which alone are active. As these surfaces are in time worn and ground away, by reason of the normal use of the machine and the resharpening of the cutting edges, respectively, the entire cutter in each instance becomes of no value after but relatively slight decrease in its size. This has made the cutters expensive, especially the forward movable cutter, which is usually as much as four inches in length, and requires frequent replacement.

Another object therefore is to provide elements of this character, comprising supporting members, reversible cutting heads, and means to detachably secure said heads to said members, so that as the former wear or are ground thin beyond a definite feasible limit, they may be discarded with relatively small loss and replaced by new heads at similarly small cost.

A further object is to provide a modified form of both reversible and invertible cutter head, each side of which is provided with a plurality of angularly disposed surfaces in which the cutting edges lie, but only one of which surfaces is exposed at a given time to frictional contact with the corresponding surface of the opposite or cooperating cutter head, so that such frictional contact does not result in wearing down the cutting edge of an inoperative surface, but which inoperative surface or surfaces can be brought into operative position by merely detaching the head from the supporting member, either reversing or inverting said head, and then securing it again in operative position upon said member.

With these and other objects in mind, the invention comprises further details of construction and operation, which are fully brought out in the following description, when read in conjunction with the accompanying drawing, in which Fig. 1 is a side elevation of both the stationary and a portion of the movable cutter elements; Fig. 2 is an elevational view of the operating surfaces of the stationary cutter head and its supporting member; Fig. 3 is a similar view of the movable cutter head and its supporting member; Fig. 4 is a section on the line 4—4 of Fig. 2; Fig. 5 is a section on the line 5—5 of Fig. 3; Fig. 6 is an elevational view of the operative faces of a cutter head and its supporting member, showing a modified form of the invention; Fig. 7 is a section on the line 7—7 of Fig. 6; and Figs. 8 and 9 are elevational views of the stationary and movable cutters and their supporting members, respectively, of slightly different shapes than those of Figs. 1 to 5.

Referring first to Figs. 1 to 5, a stationary cutting element comprises a supporting member 1, which is normally secured by a bolt passing thru an aperture 2 to a single staying machine, or other device for which this type of cutter is adapted, said member being provided with a recess 3, within which is positioned a fixed lug or pin 4, adapted to enter one of the apertures 5 of a cutting head 6, which head is of substantially the same shape as said recess, and is normally secured therein by means of one or more screws or bolts 7. Said head and supporting member are further characterized by aligned apertures 8, while one portion of each of the opposite surfaces of the periphery of the aperture in said head is defined by cutting edges 9 and 10 of any desired shape and arrangement, and it is to be noted that by merely removing and reversing the cutter head either of said pairs of cutting edges is brought into operative position with respect to the movable cutter element. Both head and adjacent member are cut away at 11 upon their lower portions in order to pass the angular corner portion of a box (not shown), when the machine is in the operation of securing a stay or binding strip thereto.

The movable cutter element in turn comprises a supporting member 12, the rear end face of which is provided with a recess 13, in which is secured by means of a screw 14 or the like a cutter head 15, having a plurality of apertures 16 into which normally extend one or more lugs or pins 17, the under portions of both said head and supporting member being cut away at 18, while the edges 19 and 20 of the cutaway region in said head are of any desired shape and arrangement, in order to properly cooperate with the cutting edges 9 and 10 of the stationary cutter head, when severing that portion of a stay or binding strip attached to a box or other article from the remaining portion of the same. Thus, this movable cutter head can likewise be removed from its supporting member, reversed and again attached thereto, exactly the same as the stationary cutting head, thereby offering two sets of cutting edges upon each head, with resulting lengthened use of each head before it becomes necessary to shut down the staying or other machine for the purpose of re-sharpening said edges, and thereby making it possible to easily replace a head after being repeatedly worn and re-sharpened beyond feasible thinness, without destroying the supporting member.

Referring now to Figs. 6 and 7, there is here illustrated a modified form of cutting head and supporting member, and while only a stationary element is shown, it is to be understood that the principle involved is equally applicable to a movable or reciprocating element. In this case, therefore, the supporting member 21 is provided with a transversely extending recess 22, the inner surface 23 of the upper portion of said recess being parallel with the exposed or operating surface 24 of said member 21, while the lower portion 25 of said recess is at least slightly angularly positioned, so that said recess decreases slightly in depth downwardly. A cutter head 26 is normally secured within said recess by means of one or more screws or bolts 27, and said head in this instance is a parallelogram in cross section, comprising in the main a shearing surface 28, lying in the plane of the operating surface 24 of the supporting member, a diagonally positioned inoperative shearing surface 29, positioned against the inner surface 23 of said recess 22, a second inoperative shearing surface 30, positioned against the inner surface 25 of said recess, and a third inoperative surface 31, parallel with and diagonally positioned with respect to the adjacent surfaces 25 and 30 and directly opposite the surfaces 23 and 29, said last-named shearing surface 31 thereby being depressed beneath the outer operating surface 24 of said member.

As seen in Fig. 6, the central portions of said head and supporting member are provided with aligned apertures 32, the normal upper and lower portions of the periphery of the aperture in said head being so formed as to provide angularly disposed cutting edges 33 and 34, which in a single staying machine or the like function the same as the corresponding cutting edges 9 and 10 in that form of the device first described (Fig. 2). However, in this instance two forward and two rearward sets of cutting edges are provided, thus making four in all, so that when the forward lower set become dulled, the head may be detached and either inverted or reversed, so as to bring into operative position a sharpened set of such edges. In this manner all of the four sets of cutting edges may be used in turn, before it is necessary to re-sharpen or regrind any of them. Also, in any of such four operative positions, said head is maintained firmly positioned by means of the upper and lower walls of the recess 22, by the one or more screws or bolts 27, and by one or more pins 35 carried by the supporting member and normally extending into properly positioned apertures 36 in said head, regardless of which operative position said head may assume.

Figs. 8 and 9 are intended merely to show stationary and movable members 37 and 38, respectively, in which the respective cutting heads 39 and 40 are secured exactly as in the form of the device first described, and illustrated in Figs. 2 and 3, the only difference being that the supporting member 37 is of somewhat different shape from that of the corresponding member 1, while the movable member 38 in the main is rectangular in cross section, instead of being substantially circular like the member 11 of Fig. 3.

It is thus apparent that the broad principle of the invention is adapted to be incorporated in various types of machines, without departing from the scope of the invention or of the appended claims.

Having thus described my invention, what I claim and desire to protect by Letters Patent of the United States is:—

1. A cutting element, comprising a supporting member having a recess, one portion of the inner wall of said recess being parallel with the operating face of said member, another portion extending angularly with respect to said first portion, and a cutting head normally positioned in said recess and having inoperative cutting surfaces lying adjacent to each portion of the inner surface of said recess, a cutting surface lying substantially in the plane of the operating surface of said member, and a third inoperative cutting surface extending from said last-named cutting surface angularly into said recess, free from engagement with the opposed surface of a companion cutting head movably mounted with respect to and in frictional engagement with said first cutting head.

2. A single staying machine for staying the corners of paper boxes, comprising a supporting member having a recess of the same width of and open upon the opposite sides of said member, said recess being bounded vertically by shoulders, a reversible cutting head normally positioned in said recess between said shoulders and exposed in the planes of the laterally opposite sides of said member, means to secure said head in obverse or reverse position, and means to prevent lateral movement of said head in said recess independent of said securing means and said shoulders.

ELMER E. HEARING.